(No Model.)

C. W. CLARK.
COAL OR ASH SIFTER.

No. 423,373. Patented Mar. 11, 1890.

WITNESSES.

INVENTOR.
Charles W. Clark.
by his Attorneys,
Brown Bros.

UNITED STATES PATENT OFFICE.

CHARLES W. CLARK, OF MALDEN, MASSACHUSETTS.

COAL OR ASH SIFTER.

SPECIFICATION forming part of Letters Patent No. 423,373, dated March 11, 1890.

Application filed September 10, 1889. Serial No. 323,539. (No model.)

*To all whom it may concern:*

Be it known that I, CHARLES W. CLARK, a citizen of the United States of America, and a resident of Malden, in the county of Middlesex and State of Massachusetts, have invented certain new and useful Improvements in Coal or Ash Sifters, of which the following is a full, clear, and exact description.

This invention relates to an apparatus more especially designed for sifting ashes, although, as is obvious, it can be used for sifting coal and other substances; and the invention consists of a sifter, all as hereinafter described, and pointed out in the claim.

Figure 1:
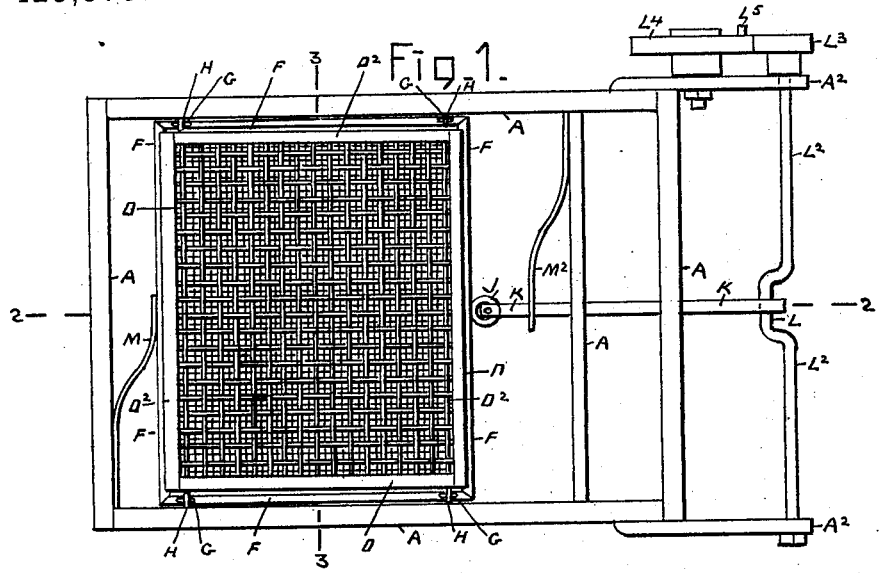
Figure 2:
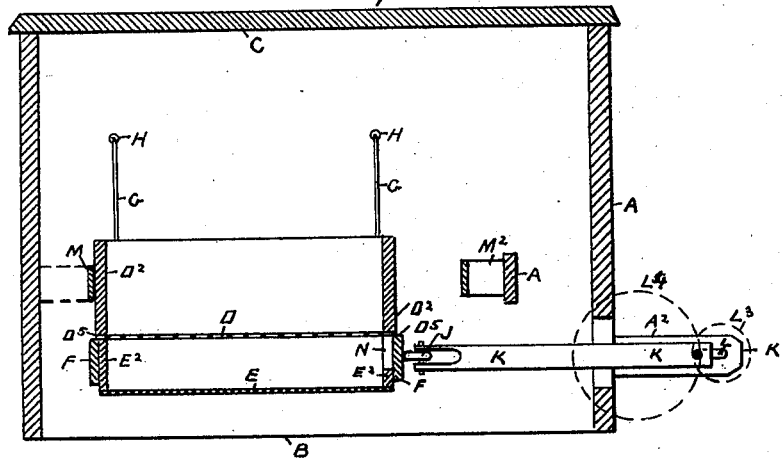
Figure 3:
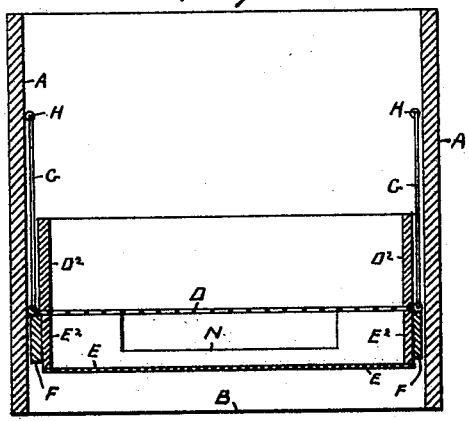

In the drawings forming part of this specification, Figure 1 is a plan view. Fig. 2 is a central longitudinal vertical section, line 2 2, Fig. 1. Fig. 3 is a transverse vertical section, line 3 3, Fig. 1.

In the drawings, A represents a rectangular box or casing, open at its under side B and closed at its upper side by a lid C, suitably hinged or otherwise adapted, as well known, but not shown, to be opened and closed at pleasure.

D E are two sieves, each carried by a box-frame $D^2$ $E^2$, respectively, and of different meshes. The sieve D has the larger mesh, and it is placed above the sieve E of the smaller mesh, and the two are secured together in any suitable manner. Again, the frame $D^2$ of the upper sieve D at its opposite ends laps over, as at $D^5$ $D^5$, the corresponding ends of the frame $E^2$ of the lower sieve E.

F is a frame, interiorly of a size corresponding to the exterior of the frame $E^2$ of the lower sieve E. The frame of lower sieve lies within the frame F, and the frame of upper sieve at its ends $D^5$ overlaps and rests on the corresponding end pieces of the frame F, by all of which the sieves and their frames as one are held in and supported on the frame F, while free to be placed therein and removed therefrom at pleasure. The frame F on its opposite sides and near its opposite ends is suspended by vertical rods G from fixed ear-pieces H of the box A, so as thereby to be free to be swung forward and backward within the box operated by mechanism connected therewith and supported on the box, all as will be now explained.

J is an eye held on one end of the sieve-carrying frame F, and K is a rod at one end pivoted on the eye J and at its opposite end hung on the crank L of a horizontal shaft $L^2$, turning at its opposite end portions in and confined against escape from bearings of a suitable support $A^2$ of the box A.

$L^3$ is a pinion at one end of a shaft $L^2$, meshing a driving gear-wheel $L^4$, suitably supported and turning in the supports $A^2$, and having a crank-handle $L^5$ for convenience in turning it. By turning the driving gear-wheel $L^3$ in either direction the frame F and the double sieve D E are oscillated within the box or casing A.

M $M^2$ are bent spring-arms, each at one end fixed to the box A, and at the other end free and in position to serve as bumpers on the frame F at the opposite ends of each of its reciprocatory movements, and thereby throwing the sieve and its contents, the better to accomplish the sifting or separating of the contents.

The ashes, &c., to be sifted are placed in the upper sieve and thereby sifted, and portions of them passing into the lower sieve to be thereby again sifted, on which, when the sifting is completed, the sieves are removed from their common carrying-frame F and each emptied of its contents, the contents of the lower sieve passing out thereof at the open slot N at one end of its frame.

Having thus described my invention, what I claim, and desire to secure by Letters Patent, is—

A sifter for ashes, &c., composed of a casing A, a horizontal frame F, suspended at its opposite ends by vertical links or rods G, pivoted at their lower ends to the sides of said frame and at their upper ends to the casing, a horizontal rod K, and a horizontal crank and operating-shaft L $L^2$, connected at its crank L by said rod K to frame F, in combination with upper and lower horizontal sieves D E, of different mesh, frames $D^2$ $E^2$ for sieves D E, and the lower frame E² shaped to fit within the frame F and having an opening N, and the upper frame D³, by its ends D⁵, overlapping and resting on the frame F, and bumper-springs M M² for frame F, fixed at opposite ends of the casing, all as described, for the purposes specified.

In testimony whereof I have hereunto set my hand in the presence of two subscribing witnesses.

CHS. W. CLARK.

Witnesses:
ALBERT W. BROWN,
MARION E. BROWN.